(12) United States Patent
Platzman et al.

(10) Patent No.: US 6,697,542 B2
(45) Date of Patent: Feb. 24, 2004

(54) INTEGRATED OPTICAL SWITCHES USING NONLINEAR OPTICAL MEDIA

(75) Inventors: Philip Moss Platzman, Short Hills, NJ (US); Robert Waverly Zehner, Cambridge, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 20 days.

(21) Appl. No.: 09/752,634

(22) Filed: Dec. 29, 2000

(65) Prior Publication Data

US 2004/0017960 A1 Jan. 29, 2004

(51) Int. Cl.[7] .............................................. G02F 1/295
(52) U.S. Cl. ......................................................... 385/5
(58) Field of Search ................................ 385/5, 1, 2, 4, 385/3, 9, 14, 15, 16, 18

(56) References Cited

U.S. PATENT DOCUMENTS

| | | | | |
|---|---|---|---|---|
| 4,793,676 A | * | 12/1988 | Risk | 385/1 |
| 5,214,664 A | * | 5/1993 | Paoli | 372/46 |
| 5,416,338 A | * | 5/1995 | Suzuki et al. | 257/21 |
| 5,440,421 A | | 8/1995 | Fan et al. | 359/344 |
| 5,600,483 A | | 2/1997 | Fan et al. | 359/344 |
| 5,754,714 A | * | 5/1998 | Suzuki et al. | 385/5 |
| 5,757,832 A | * | 5/1998 | Uchida | 372/45 |
| 5,784,400 A | | 7/1998 | Joannopoulos et al. | 372/96 |
| 5,802,236 A | | 9/1998 | DiGiovanni et al. | 385/127 |
| 6,101,300 A | * | 8/2000 | Fan et al. | 385/27 |

OTHER PUBLICATIONS

Noda, S. et al., *Nature*, "Trapping and Emission of Photons by a Single Defect in a Photonic Bandgap Structure", vol. 407, pp. 608–610, Oct. 5, 2000.
Painter, O. et al., *Science*, "Two–Dimensional Photonic Band–Gap Defect Mode Laser", vol. 284, pp. 1819–1821, Jun. 11, 1999.
Fan, S. et al., *Optics Express*, "Channel Drop Filters in Photonic Crystals", vol. 3, No. 1, Jul. 6, 1998.
Bennett, B.R. et al., *IEEE*, "Carrier–Induced Change in Refractive Index of InP, GaAs, and InGaAsP", vol. 26, No. 1, pp. 113–122, Jan. 1990.

* cited by examiner

*Primary Examiner*—Frank G. Font
*Assistant Examiner*—Kevin Kianni
(74) *Attorney, Agent, or Firm*—John F. McCabe

(57) ABSTRACT

An optical device provides optical routing functions, such as switching or redirecting of optical signals. The device utilizes one or more control light beams, which couple through a top surface of a planar substrate (via relatively small control windows) into one or more preselected regions of optical channels formed in the substrate. The presence of a control light beam at a control window increases the refractive index of the nonlinear optical medium of a portion of a channel. The portion of the channel includes a structure that functions as an on/off filter to reflect or transmit an optical signal propagating in the channel in a manner that is responsive to the intensity of the control light beam applied to the portion of the channel. In some embodiments, the optical channels interrupt a 2D PBG structure, which functions as a boundary for the optical channels.

7 Claims, 4 Drawing Sheets

INTEGRATED OPTICAL SWITCHES USING NONLINEAR OPTICAL MEDIA

TECHNICAL FIELD

The present invention relates to optical devices that use non-linear optical mediums.

BACKGROUND OF THE INVENTION

In optical waveguides used in optical data transmission and optical laser cavities, light propagates in one spatial direction. These waveguides use total internal reflection at an interface between two media with relatively higher and lower refractive indices to direct the light. Total internal reflection causes the light to propagate in the medium with the higher refractive index.

Periodic dielectric structures can also be used to direct light propagation. In periodic dielectric structures, light propagation is analogous to electron propagation in a crystal. If the wavelength of the light is of the order of the dimensions of the lattice, a photonic bandgap (PBG) forms. The PBG is a wavelength range in which photons cannot propagate through a periodic dielectric structure. If incident light's wavelength is in the PBG, the incident light is reflected off the periodic dielectric structure rather than transmitted through the structure. Period dielectric structures whose lattice lengths are of the order of wavelengths of near infrared or visible light are often referred to as PBG structures. Light with a wavelength in a PBG can propagate down a narrow channel in a PBG structure.

Proposals exist for using PBG structures to make optical cavities. An article entitled "Two-Dimensional Photonic Band-Gap Defect Mode Laser" by O. Painter et al. appearing in the Jun. 11, 1999 issue of *Science* (p. 18 et seq.) describes the formation of a laser cavity in a two-dimensional (2D) a 2D PBG structure. The laser cavity is fabricated in a group III–V crystalline semiconductor and uses a channel in a 2D PBG structure and a defect to form the laser cavity.

SUMMARY OF THE INVENTION

One aspect of the present invention relates to an integrated optical switch that includes a planar waveguide with a one-dimensional (1D) optical waveguide therein. The 1D waveguide has a specific interaction region that defines a filter. The filter is, at least in part, made of a nonlinear optical medium and is controllable by externally introduced control light. Changing the intensity of the control light causes optical switching by changing the index of refraction of the nonlinear medium so that the filter changes between first and second states. The filter transmits light propagating in the 1D waveguide in the first state and reflects light propagating in the 1D waveguide in the second state.

In some embodiments, the 1D waveguide is formed from a PBG structure and a channel therein. The PBG structure causes the channel to function as a 1D waveguide in which a selected wavelength range of light propagates. The channel is formed of a nonlinear optical medium and includes a resonant cavity formed of a periodic array of holes with a defect. Switching results from applying a control light beam that changes the index of refraction of the medium in the cavity and thus, the resonant frequency of the cavity.

Exemplary switches use PBG structures in III–V semiconductors, e.g., semiconductors comprising elements from the group consisting of gallium (Ga), arsenic (As), indium (In), and phosphorus (P), and wavelengths of control light that generate carrier densities in these semiconductors. The presence of carrier densities strongly modifies the medium's index of refraction and the resonant frequencies of optical cavities therein. These exemplary switches are able to switch light with wavelengths between about 0.9 and 1.65 µm.

Various embodiments of the present invention will become apparent during the course of the following discussion and by reference to the accompanying drawings.

DETAILED DESCRIPTION

Figure 1A:
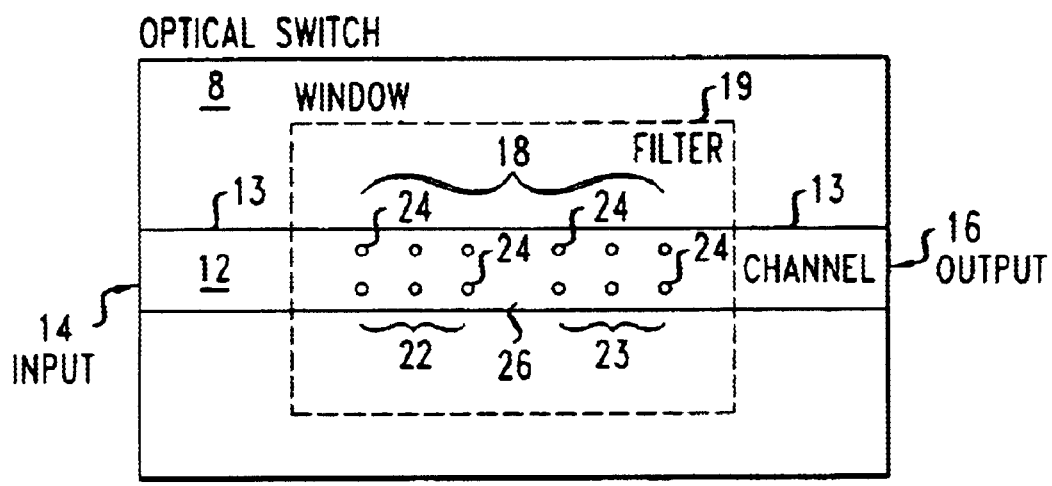
FIGS. 1A and 1B show respective top and side views of an integrated optical switch.
Figure 1B:
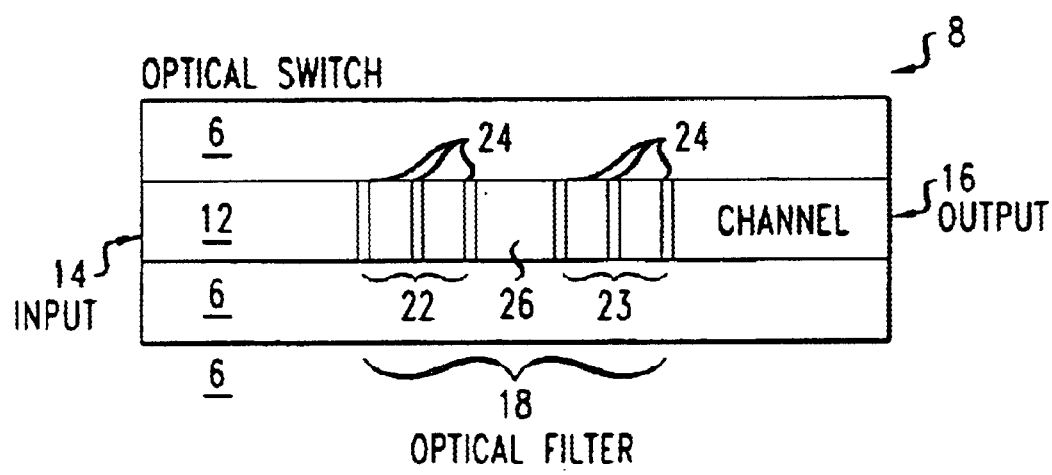

FIGS. 1A and 1B show respective top and side views of a planar structure 8 that forms an integrated 1×1 optical switch. In the planar structure 8, propagating light is confined to a center layer by total internal reflection off upper and lower outer layers 6. The planar structure 8 includes a 1D optical channel 12 made of a nonlinear optical medium, e.g., a semiconductor including elements from the group consisting of Ga, As, In, and P or another group III–V semiconductor. The channel 12 and boundaries 13 form a 1D optical waveguide that guides light from an optical input 14 to an optical output 16. The channel 12 includes an optical filter 18 that transmits channel light in a selected wavelength range and reflects channel light in other wavelength ranges. The wavelength selectivity of the filter 18 is controllable by control light introduced into the filter 18 through a control access window 19. The control access window 19 is located on the top face of the planar structure 8. The channel 12 responds to changes in the intensity of control light in the filter 18 as an optical switch.

The 1D optical waveguide includes a propagation medium in channel 12 and boundaries 13 that laterally confine light to propagate in the medium of the channel 12. In one embodiment, the channel 12 is formed of a group III–V semiconductor and lateral boundaries 13 are formed of one or more dielectric layers. The dielectric layers have an index of refraction that is lower than that of the semiconductor of the channel 12. Thus, the lateral layers confine light to propagate along the channel 12 by total internal reflection. In some embodiments, channel 12 has a lateral width that varies with distance from the input 14.

Figure 1C:
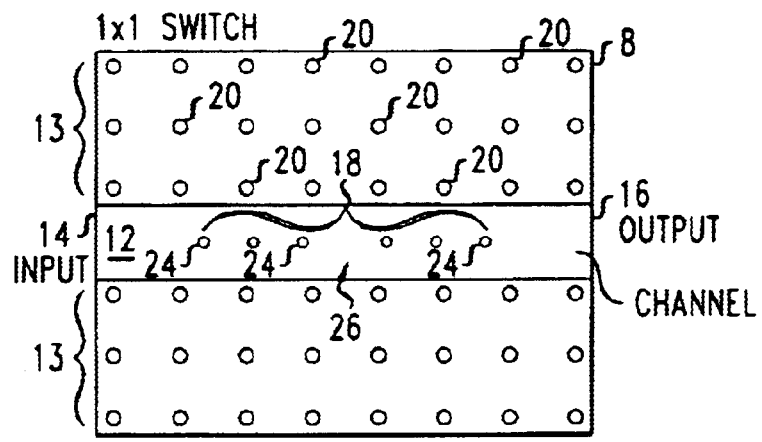
FIG. 1C is an embodiment of the switch of FIGS. 1A–1B based on a PBG structure.

FIG. 1C shows one embodiment of structure 8 of FIGS. 1A–1B in which channel 12 is a group III–V semiconductor medium and lateral boundaries 13 are periodic arrays of identical scattering objects 20 located in the same semiconductor medium. Thus, the boundaries 13 form a PBG structure that is interrupted by the channel 12, i.e., channel 12 is free of the objects 20. The objects 20 have a different index of refraction than the semiconductor medium. Exemplary objects 20 include cylindrical holes that transverse planar structure 8 and inclusions in the planar structure 8.

The PGB structure laterally confines light to propagate in channel 12 by coherent diffraction from the array of objects 20. Furthermore, the PBG structure restricts light propagation in channel 12 to a selected wavelength range. Light in other wavelength ranges reflects off side faces of planar structure 8 instead of entering into the channel 12.

Referring to FIGS. 1A–1C, filter 18 includes an array of regularly spaced identical objects 24 and a defect 26 in the array. The objects 24 have an index of refraction that differs from the index of refraction of the surrounding medium and thus, scatter light propagating in channel 12. Exemplary objects 24 include inclusions or holes that traverse planar structure 8. An exemplary defect 26 is a larger or smaller separation between two sequentially adjacent objects 24 in channel 12 than the separation between other sequentially adjacent objects 24 of the filter 18. Another exemplary defect 26 is one object 24 that is larger or smaller than the other objects 24 of the filter 18.

Defect 26 separates the array of objects 24 into two smaller arrays 22, 23 that are sequentially adjacent in channel 12. Exemplary separations between arrays 22, 23 are about ¼ to 2 times the wavelength of light propagating in channel 12. Together the defect 26 and the smaller arrays 22, 23 function like a resonant optical cavity for light propagating in channel 12. The smaller arrays 22, 23 are distributed reflectors for the resonant cavity. The resonant cavity allows a narrow range of wavelengths of light to be transmitted and thus, functions as a band-pass filter 18.

Figure 1D:
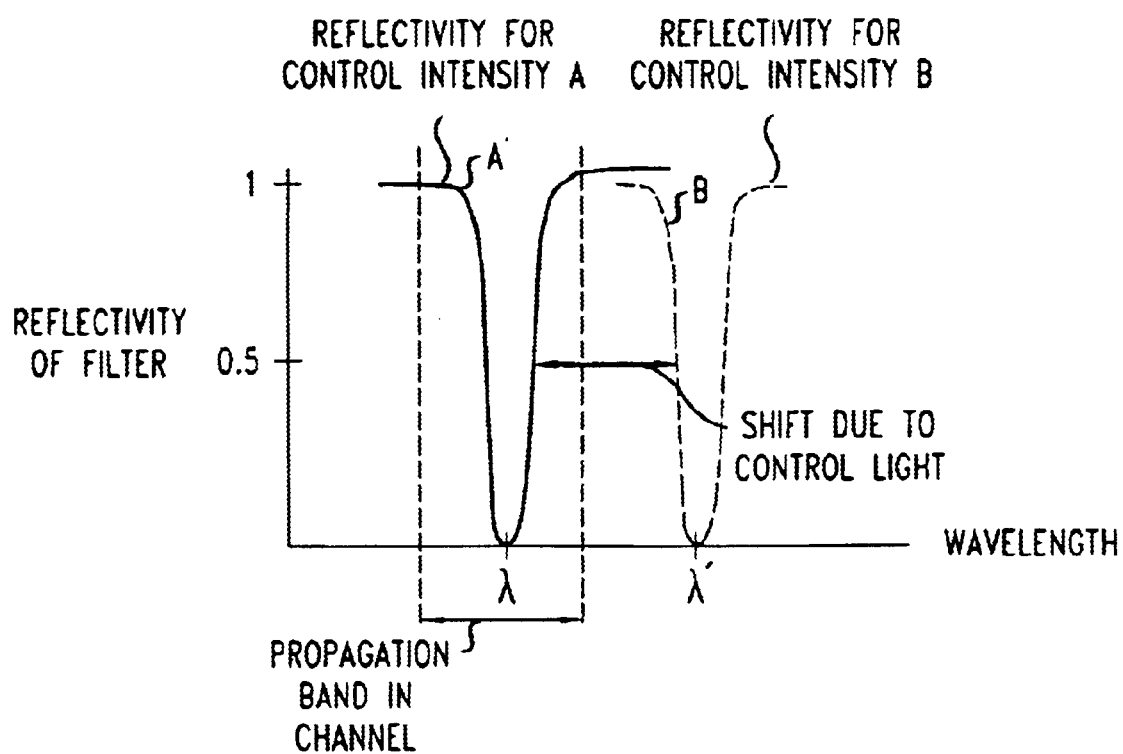
FIG. 1D illustrates how the reflectivities of filters used in the switches of FIGS. 1A–1C depend on the intensity of a control light beam.

FIG. 1D illustrates how the spectral reflectivities (or transmissivities) of filters 18, shown in FIGS. 1A–1C, depend on the control light intensities introduced into the filters 18. The reflectivities depend on the control light intensity, because the filters 18 are made in a nonlinear optical medium whose index of refraction depends on light intensities therein.

FIG. 1D shows that control light intensities A and B produce center wavelengths $\lambda$ and $\lambda'$, respectively, for the passband of filters 18. Control light of intensity A puts the filter 18 in a state that transmits wavelengths propagating in channel 12. Control light of intensity B shifts the filter's center wavelength so that light of the original wavelength $\lambda$ is now outside the filter's passband. Thus, control light of intensity B puts the filter 18 in a state that reflects light propagating in the channel 12.

The size of the shift, i.e., $|\lambda-\lambda'|$, to the center wavelength of the filter 18 depends on the nonlinear optical medium, the wavelength of the control light, and the intensity change to the control light. For a semiconductor medium, wavelengths that correspond to energies above the bandgap produce electron and hole carrier densities and thus, cause relatively larger shifts to refractive indexes and to the center wavelength of the filters constructed in such mediums. Nevertheless, even for the optically responsive III–V semiconductors, moderate changes in the intensity of the control light only generate about a 1 percent shift to the index of refraction and a comparable shift to the center wavelength of a filter constructed in such a medium. For a 1 percent shift in refractive index, the reflectivity needs a Q of about 100 or more if shifted and unshifted passbands of filter 18 are to not significantly overlap. Herein, Q is the inverse of the full width of the reflectivity curve at half maximum.

To produce a 1 percent refraction index shift in a semiconductor medium formed of Ga, As, In, and P, control light is chosen to have a wavelength whose energy is close to that of the electronic bandgap of the Ga, As, In, and P based semiconductor, e.g., the energy is equal to about 0.1 and 0.5 electron volts (eV) plus the energy of the electronic bandgap. This choice for the wavelength enables absorption of most of control light in the interior of a thin channel 12, a channel whose thickness is about 0.3 to 1.5 microns. Such a channel is adapted to use in a structure 8 that switches wavelengths of about 1.55 microns—wavelengths that correspond to energies slightly below the electronic bandgap.

For filter 18 of FIGS. 1A–1C to produce an optical switch, the change in refractive index produced by control light, should switch the filter 18 between reflective and transmissive states for light propagating in channel 12. For available center wavelength shifts of about 1 percent, such state change to the filter 18 usually requires that the filter 18 have a high Q. The filter 18 can have a high Q if both arrays 22, 23 have 3–5 or more objects 24 serially spaced along channel 12 and if separations between serially adjacent objects in the arrays 22, 23 is about ¼ to 2 times the filter's center wavelength.

Figure 1E:
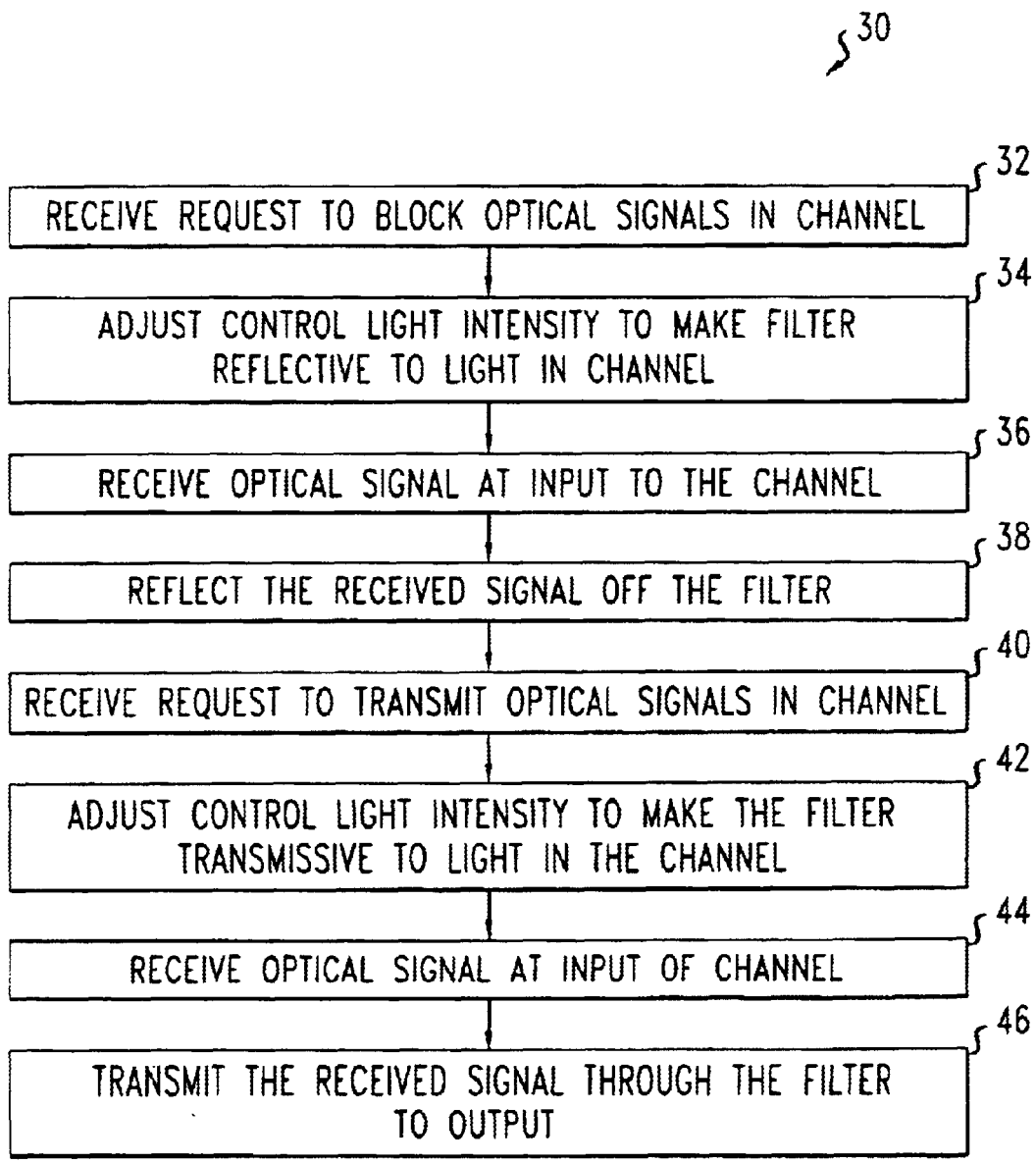
FIG. 1E is a flow chart for a method of operating the integrated optical switches of FIGS. 1A–1C.

FIG. 1E is a flow chart for a method 30 of operating the integrated optical switches of FIGS. 1A–1C. At an initial time, a request to block optical transmissions through the switch's channel 12, is received by a switch controller (step 32). In response to the request, the controller adjusts the control light intensity in filter 18 to cause filter 18 to reflect light propagating in the channel 12 (step 34). The control light is introduced into the filter 18 through transparent control access window 19 of planar structure 8. In response to the control light intensity, the filter's spectral response shifts so that the filter 18 is in the reflective state described above. While maintaining the same control light intensity, an input optical signal is received at optical input 14 of the channel 12 (step 36). In response to the control light, the filter 18 reflects the input optical signal back towards the input 14 (step 38). At a later time, a new request to transmit optical transmissions through the channel 12 is received by the controller (step 40). In response to the new request, the controller readjusts the control light intensity to a new value that causes the filter 12 to transmit light propagating in the channel 12 (step 42). While maintaining the intensity of the control light, an input optical signal is received at an optical input 14 of the channel 12 (step 44). In response to the new control light intensity, the channel 12 transmits the input optical light through the filter 12 to an output 16 of the channel 12 (step 46).

The optically controllable filter 18 and channel 12 of FIGS. 1A–1C can be used to make more complex optical switches.

Figure 2:
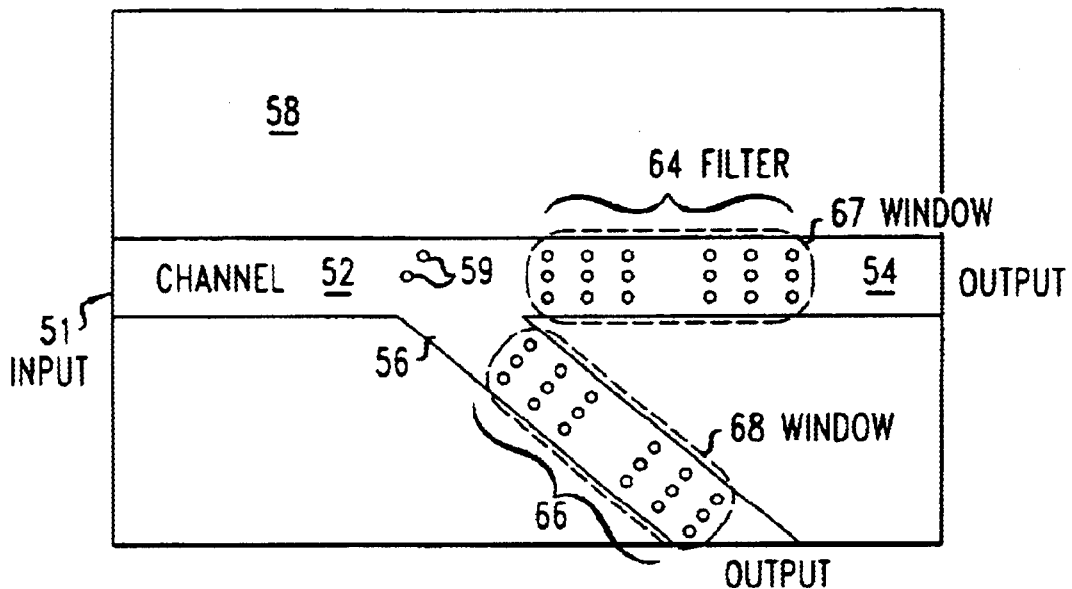
FIG. 2 is a top view of an embodiment of a 1×2 optical switch.

FIG. 2 illustrates a 1×2 optical switch 50 that includes a single input optical channel 52 and a pair of output optical channels 54, 56. Exemplary channels 52, 54, 56 are located in a 2D PBG structure (not shown). The 2D PBG structure is itself located in a planar structure 58 analogous to structure 8 of FIGS. 1A–1C. The PBG structure includes a 2D periodic array of identical objects whose index of refraction differ from that of the nonlinear optical media of planar structure 58, e.g., the objects may be holes through the planar structure 58. The channels 52, 54, 56 interrupt the 2D array of the PBG structure. The PBG structure coherently diffracts light received at input 51 thereby causing a range of wavelengths of the input light to propagate along the channels 52, 54, 56. The light propagates down input channel 52 and thereafter amplitude splits to propagate along output channels 54 and 56. The planar structure 58 confines light propagation in the direction normal to the structure's plane by total internal reflection.

The 1×2 switch also includes arrays 64, 66 of objects in specific regions of both output channels 54, 56. The arrays 64, 66 function as resonant optical cavities analogous to the array of objects 24, shown in FIGS. 1A–1C. The arrays 64, 66 function as optical filters with optically controllable transmissivities to light propagating in associated channels 54 and 56. The arrays 64, 66 are independently controlled by the intensities of control light beams introduced into the arrays 64, 66 via transparent control access windows 67, 68 in the top surface of planar structure 58. The intensities of control light beams switch arrays 64, 66 between transmissive and reflective states to selectively switch input light to output channels 54, 56.

In particular, introducing a selected control light intensity at a wavelength slightly above the bandgap of the medium (e.g., 1.2–1.3 $\mu$m for some crystalline semiconductors formed of Ga, As, In, and P) into window 67 changes the refractive index in array 64. The new refractive index causes the array 64 to reflect light received from input channel 52 into channels 52, 56 and to stop light from propagating into channel 54. Some embodiments position one or more optical scattering objects 59, e.g., holes, near the intersection between channels 54 and 56 to increase the percentage of the reflected light that ends up in the output channel 56.

A control light beam can also be introduced into window 68 to cause array 66 to become reflective to light received from input channel 52. Then, light is reflected by the array 66 into channels 52, 54 instead of propagating through channel 56.

Figure 3:
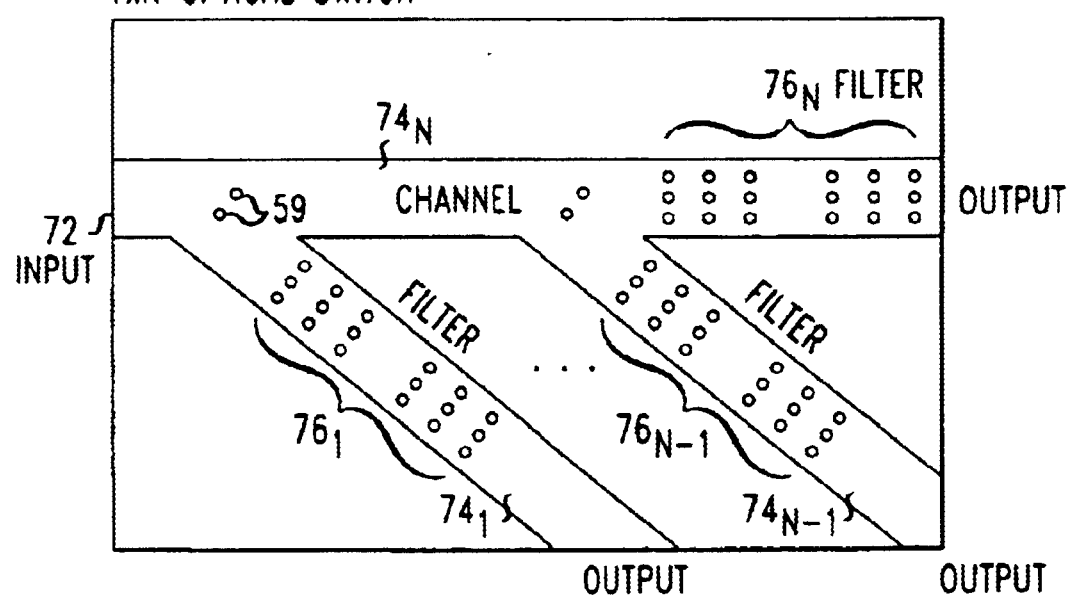
FIG. 3 is a top view of an embodiment of a 1×N optically controllable coupler.

FIG. 3 is a top view of a planar structure 70 that functions as a 1×N optical switch. The structure 70 includes an input optical channel 72 and N output optical channels $74_1$–$74_N$. Each output optical channel $74_1$–$74_N$ includes a filter $76_1$–$76_N$ that is controllable by an independent control light beam and is analogous to filter 18 of FIGS. 1A–1C. The intensities of individual control light beams determine whether the associated filters $76_1$–$76_N$ are transmissive or reflective to light in the associated channels $74_1$–$74_N$ and thereby control routing of an optical signal from input channel 72 through the switch.

Exemplary switches are the planar structure 70 with an embedded 2D PBG structure. The optical scattering objects of the PBG structure, e.g., holes traversing the planar waveguide, are absent from channels $74_1$–$74_N$.

Each filter $76_1$–$76_N$ may be formed of an array of objects analogous to the array used in filter 18 of FIGS. 1A–1C. Accordingly, the presence and/or absence of control light beams associated with individual filters $76_1$–$76_N$ will control the propagation of an input light through the output channels $74_1$–$74_N$. For example, when all control light beams are "off", each channel a filter $74_1$–$74_N$ exhibits essentially identical propagation characteristics and input light will propagate to each output channel $74_1$–$74_N$. Alternatively, if N−1 control light beams are activated, the N−1 output channels $74_1$–$74_N$ associated with the control light beams become reflective to input light. Then, these channels $74_1$–$74_N$ reflect the input light back along input optical channel 72 and the remaining output optical channel. Thus, for this configuration, only one output channel allows the input optical signal to propagate therethrough.

In other embodiments of structure 70, additional optical filters (not shown) are positioned along locations on output channel $74_N$ between intersections with the other output channels $74_1$–$74_{N-1}$. The additional filters are similar to filter 18 of FIGS. 1A–1C and operated by separate control light beams to provide more routing control.

In the above-described switches, switching speeds are a sum of turn-on and turnoff times. The switching times depend both on properties of the bulk medium, e.g., properties of III–V semiconductors, and on the forms of the arrays of objects 24 and defects 26 used in the controllable optical filters 18, 64, 66, $76_1$–$76_N$. More particularly, carrier densities of electrons and holes induced by the control light beams fix the refractive indexes in the controllable optical filters 18, 64, 66, $76_1$–$76_N$. Thus, the turn-on times are only limited by the time needed to generate the control optical pulses that produce the needed carrier densities. On the other hand, turn-off times are limited by the times needed to recombine the same electron and hole carriers. Carrier recombination rates depend both on intrinsic properties of the bulk medium and on surface processes. Surface contributions to recombination rates depend both on surface areas and on surface properties, i.e., for surfaces of the objects 24 making up the controllable filters 18, 64, 66, $76_1$–$76_N$. The greater the number of objects 24 in a filter 18, 64, 66, $76_1$–$76_N$, the greater the actual surface contribution to recombination and the shorter the turn off time becomes. Nevertheless, shortening the turn-off time produces a proportional increase in the power that must be supplied by the optical control beam to maintain the switch in the same state. Thus, switching speeds will be limited by the power budget available to maintain the switch in a particular configuration.

Various embodiments of the optical switches shown in FIGS. 1A–1C, 2, and 3 include integrated optical amplifiers. The amplifiers provide gain that offsets signal attenuation caused by signal propagation through a semiconductor media that has injected charge carriers. Exemplary amplifiers include electrical contacts positioned across the semiconductor media of the output channels and voltage sources connected to the contacts. The voltage sources pump carrier densities in the output channels, and the pumped carrier densities amplify output signals through stimulated emission. The use of such amplifiers to offset attenuation is known to those of skill in the art.

Other embodiments of the invention will be apparent to those skilled in the art in light of the specification, drawings, and claims of this application.

What is claimed is:

1. An integrated optical switching device, comprising:
    a planar substrate having a nonlinear optical medium and a top surface;
    a one-dimensional input waveguide located in the substrate;
    a first one-dimensional output waveguide located in the substrate, the first output waveguide having a first central channel and boundaries, the boundaries configured to cause light to propagate in the first central channel;
    a first resonant optical cavity located in the first channel, the first resonant optical cavity having a spectral transmissivity to light that is responsive to the intensity of control light transmitted to the first resonant optical cavity through the top surface;
    a second one-dimensional output waveguide located in the substrate, the second output waveguide having a second central channel and boundaries configured to cause light to propagate in the second channel; and
    a second resonant optical cavity located in the second channel and having a spectral transmissivity responsive to the intensity of control light transmitted to the second resonant optical cavity through a surface of the substrate; and wherein input ends of the output waveguides open into an output end of the input waveguide and the resonant optical cavities control the optical end-coupling between the input ends of the output waveguides and the output end of the input waveguide.

2. The device of claim 1, wherein the first resonant optical cavity includes an array of objects.

3. The device of claim 2, wherein the objects are holes.

4. The device of claim 2, wherein the objects are inclusions of a second medium whose index of refraction differs from the index of refraction of the nonlinear medium of the first output waveguide.

5. The device of claim 1, wherein the nonlinear medium includes a group III–V semiconductor.

6. The device of claim 1, wherein the first and second resonant optical cavities have transmissivities that respond differently to the intensity of control light.

7. The devices of claim 1, further comprising one or more objects located near the output end of the input waveguide and configured to scatter light into the input end of the first output waveguide.

* * * * *